Dec. 11, 1951     L. E. ALBERTSON     2,578,387
FEEDER
Filed March 21, 1947     2 SHEETS—SHEET 1
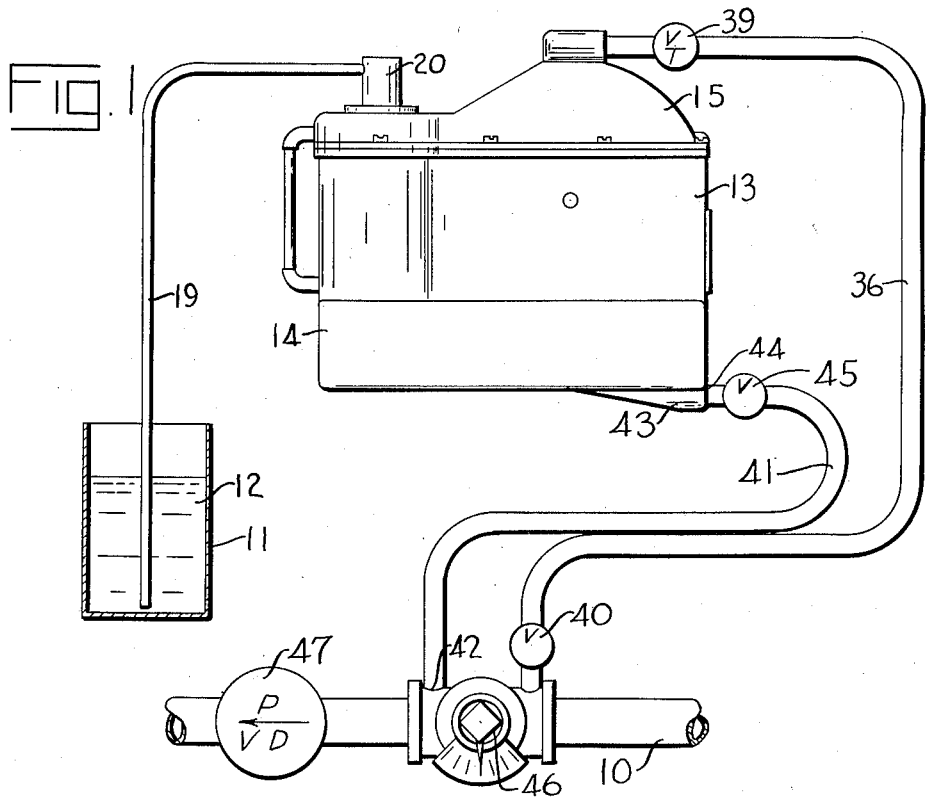
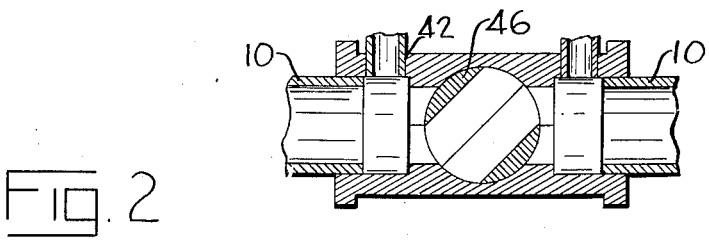
INVENTOR.
LAWRENCE E. ALBERTSON
BY
*J. H. Braddock*
ATTORNEY

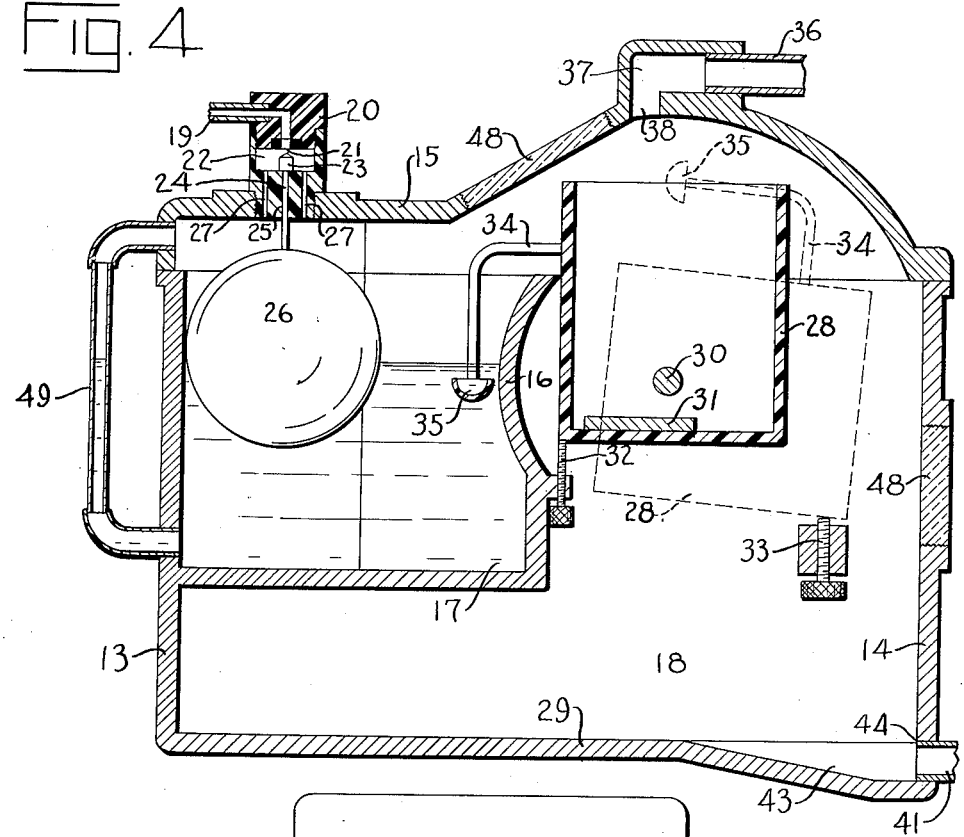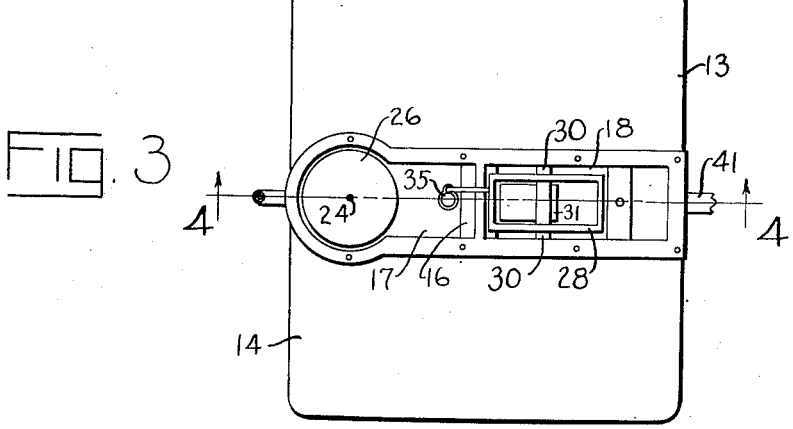

Patented Dec. 11, 1951

2,578,387

UNITED STATES PATENT OFFICE 2,578,387

FEEDER

Lawrence E. Albertson, Minneapolis, Minn., assignor to The McKays Company, St. Paul, Minn., a corporation of Delaware Application March 21, 1947, Serial No. 736,313

9 Claims. (Cl. 210—31)

This invention has relation to a feeder apparatus for causing liquids from different sources to become intermingled in predetermined proportions and delivered as a mixture of the intermingled liquids to a location for use. There are many different liquids upon which the feeder apparatus can operate in commercial practice and cause to become mixed. Merely by way of example, said feeder apparatus can operate advantageously upon water and chlorine solution and cause these to become intermingled in predetermined proportions and delivered as a mixture to a location for use.

An object of the invention is to provide a feeder apparatus of the character as stated which will be of novel and improved construction.

A further object is to provide a feeder apparatus wherein will be incorporated various desirable and improved features and characteristics of construction novel both as individual entities of the feeder apparatus and in combination with each other designed with the end in view of causing liquids from different sources to become intermingled in predetermined proportions and delivered as a mixture of the intermingled liquids at a location where said mixture is to find use.

A further object is to provide a feeder apparatus which will include a supply pipe adapted to contain a liquid, such, for example, as water, a chamber open to the action of atmospheric pressure, a reservoir in open relation to the chamber adapted to contain a liquid, such, for example, as chlorine solution, under pressure of atmospheric air, a pump or the like operating in the supply pipe, and instrumentalities through the medium of which said liquids, or water and chlorine solution, can be caused to become intermingled in predetermined proportions and delivered to a location for use.

A further object is to provide a feeder apparatus, for causing liquid substances from different sources to become intermingled in predetermined proportions and delivered as a mixture of the intermingled substances to a location for use, which will be responsive in its operation to the flow of one of said liquid substances and to air under atmospheric pressure upon another of said liquid substances.

A further object is to provide a feeder apparatus which will include a first quantity of liquid, a second quantity of liquid under pressure of air existent by reason of atmospheric pressure, and instrumentalities housing and interconnecting said first and second quantities of liquid so that liquid of one of said quantities is adapted to become intermingled with liquid of the other of said quantities in such manner that liquid of the different quantities, respectively, can be combined in predetermined proportions for delivery as a mixture of liquids from the different quantities to a location for use.

A further object is to provide a feeder apparatus which will include a supply pipe adapted to contain a quantity of a liquid under head pressure, a reservoir adapted to contain a quantity of a liquid under pressure of air existent by reason of atmospheric pressure, and instrumentalities through the medium of which said liquid under head pressure and said liquid under atmospheric pressure can be caused to become intermingled in predetermined proportions and delivered to a location for use.

A further object is to provide a feeder apparatus of the present character which will include a construction and arrangement for causing liquids from different sources, one under head pressure and the other under atmosphere pressure, to become intermingled.

A further object is to provide a feeder apparatus of the nature as set forth, for causing liquids from different sources to become intermingled in predetermined proportions and delivered as a mixture of the intermingled substances to a location for use, which will include a construction and arrangement for varying at will the relative proportions of the different liquids, respectively, of said mixture.

And a further object is to provide a feeder apparatus which will incorporate features and characteristics of construction adapted to render the feeder apparatus an improvement over the apparatuses disclosed in U. S. Letters Patent No. 2,362,606, for Feeder, granted to Henry M. Mueller and me on November 14, 1944, and U. S. Letters Patent No. 2,362,607, for Feeder, granted to me on November 14, 1944.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible as long as within the spirit of the invention and the scope of the claims which follow.

In the accompanying drawing forming a part of this specification,

Fig. 1 is a diagrammatic view of a feeder in which the features and characteristics of the invention are incorporated;

Fig. 2 is a detail sectional view of a valve of the feeder, situated between a supply pipe and a discharge pipe of said feeder, adapted to be manually adjustably controlled;

Fig. 3 is a top plan view of a body of a housing of said feeder and mechanisms of the feeder contained in said housing, a cover for the housing being omitted; and Fig. 4 is an enlarged vertical central sectional view taken on line 4—4 in Fig. 3 and additionally disclosing the cover of the housing.

A single embodiment of the invention has been illustrated and will be described. The present invention is, however, susceptible of embodiment in various forms.

With respect to the drawings and the numerals of reference thereon, a supply pipe 10 is adapted to lead from a source (not shown) of liquid, such as water.

A reservoir 11 for a liquid 12, such, for example, as chlorine solution, is open to atmospheric pressure.

A construction and arrangement of the feeder apparatus, for causing liquids, such as the liquid or water in the supply pipe 10 and the liquid or chlorine solution in the reservoir 11, from different sources to become intermingled in predetermined proportions and delivered as a mixture of the intermingled liquids at a location where the mixture is to find use, includes a mixing receptacle 13. Said mixing receptacle 13 is constituted as a housing including a rectilinear body 14 sealed closed by a removable cover 15.

A transversely disposed partition 16 within the housing 13 divides said housing into a container 17 at one side of the housing and a mixture receiving compartment 18 at the opposite side of said housing.

A feed pipe 19 for the liquid, or chlorine solution, 12 leads from near the bottom of the reservoir 11 into a fitting 20 in the cover 15 of the housing 13 above the container 17. A valve seat 21, at the inlet end of the feed pipe connection from the reservoir 11 and situated at the upper portion of a concavity 22 in the fitting 20, is adapted to be normally uncovered but closable by a valve 23 within said concavity 22 and beneath said valve seat 21. A stem 24 for the valve 23 passes freely downwardly through a vertical opening 25 in said fitting 20, and the lower end of said stem 24 is rigid with a float 26 within the container 17. Vertical ports 27, 27 at the opposite sides of the valve stem 24 and the opening 25 are open at their upper ends to the concavity 22 and at their lower ends to the container 17. The construction and arrangement are such that a constant level of the liquid or chlorine solution can be maintained in the container 17. That is, the level of liquid, or chlorine solution, 12 is adapted to be maintained substantially constant in said container 17, during practical operation of the feeder apparatus, by the float 26.

A tilt bucket 28 is situated within the mixture receiving compartment 18 of the mixing receptacle 13, at elevation above the base 29 of the housing body 14. Said tilt bucket 28 is pivotally supported, as at 30, upon side walls of said housing body 14, in adjacent relation to the partition 16, for swinging movement in a vertical plane toward and away from said partition. The pivotal support 30 for the tilt bucket is spaced from the longitudinal axis of said tilt bucket, at the left of said longitudinal axis; that is, at the side of the axis of the tilt bucket adjacent the partition 16; in the disclosure as made. A counterweight 31 upon the base of the tilt bucket and adjacent the partition 16 is for the purpose of retaining said tilt bucket when empty, or substantially empty, in upright position, as disclosed in full lines in Fig. 4 of the drawings. The construction and arrangement are such that upon reception of a predetermined amount of liquid, or water, from the supply pipe 10 the tilt bucket 28 will become tipped, or moved to the dotted line position in said Fig. 4, thus to cause liquid, or water, to become removed or spilled from said tilt bucket and deposited into the mixture receiving compartment 18. After tipping, the tilt bucket will move from its dotted line position to its full line position in Fig. 4, due to the weight of the counterweight 31. A stop 32 is for limiting swinging movement of the tilt bucket 28 in direction toward the partition 16, and a stop 33 is for limiting swinging movement of said tilt bucket in direction away from said partition and toward the base 29 of the body 14 of the housing 13.

An arm 34, rigidly secured to an upper portion of the tilt bucket 28, extends outwardly and downwardly from said tilt bucket at the side thereof adjacent the container 17, and a dipper 35 fixed to the outer end of said arm 34 is adapted to be submerged in liquid, or chlorine solution, in said container 17 when said tilt bucket is in upright position. With each tipping of the tilt bucket 28, or movement of said tilt bucket from the full line position to the dotted line position in Fig. 4, a dipper full of liquid, or chlorine solution, is removed from the container 17 and deposited in the mixture receiving compartment 18. That is, upon the tipping of the tilt bucket, the dipper is moved from its full line position to its dotted line position in said Fig. 4. Upon return of said tilt bucket to upright position, said dipper becomes again situated below the level of the liquid, or chlorine solution, in said container 17. When a dipper full of liquid, or chlorine solution, is removed from the container 17, the float 26 will become slightly depressed to cause the valve 23 to open. Said valve 23 will remain open until substantially a dipper full of liquid, or chlorine solution, from the feed pipe 19 has replaced the liquid, or chlorine solution, removed from said container 17, and then the valve will close, by reason of elevation of said float 26.

A liquid of water feed pipe 36 leads from the supply pipe 10 and enters the cover 15 of the mixing receptacle 13, and a port 37 in said cover 15, with which the liquid or water feed pipe 36 communicates, is open, as at 38, to the mixture receiving compartment 18 at location directly above the tilt bucket 28. Said feed pipe 36 is adapted to deliver liquid or water, by way of the port 37, directly into said tilt bucket 28 when the latter is in upright position. A manually actuable valve 39 in the feed pipe 36 at location adjacent the cover 15 is for controlling and regulating flow of liquid or water from the supply pipe 10 into said tilt bucket 28, and a check valve in said feed pipe 36 at location adjacent said supply pipe 10 is denoted 40.

A discharge pipe 41 for mixture of liquids leads from the mixture receiving compartment 18 and enters the supply pipe 10 at location, denoted 42, in spaced relation to the feed pipe 36, at the side of said feed pipe opposite the source of supply of liquid or water. The base 29 of the body 14 of the housing 13 includes a concavity 43, and the discharge pipe 41 is suitably and conveniently connected, as at 44, with said housing 13 at the location of said concavity 43. A manually actuable valve 45 in the discharge pipe 41 at location adjacent the housing 13 is for controlling and regulating the amount or rate of flow of mixture of liquids through said discharge pipe 41.

Passage of liquid or water through the supply pipe 10 is adapted to be adjustably controlled by a manually actuable valve 46 situated at location between the feed pipe 36 and the discharge pipe 41.

A suction pump 47, which may be of any ordinary or preferred type, is situated in the supply pipe 10 at the side of the discharge pipe 41 opposite the feed pipe 36 and has its inlet side adjacent said discharge pipe 41.

Sight glasses in the body 14 and the cover 15 are represented at 48, 48, and a liquid level indicator for making visible the level of liquid, or chlorine solution, in the container 17 is designated at 49.

The feeder apparatus is adapted to cause liquid substances, such, for example, as water from the supply pipe 10 and chlorine solution 12 from the reservoir 11, from different sources to become intermingled in predetermined proportions in the mixture receiving compartment 18 of the mixing receptacle 13 and delivered as a mixture of the intermingled liquid substances to a location for use in response to head pressure upon one of the liquid substances, i. e., water from the supply pipe 10, and air under atmospheric pressure upon another of the liquid substances, i. e., chlorine solution in said reservoir 11.

When the suction pump 47 is inoperative, static conditions will prevail and the pressure in the supply pipe 10, the mixing receptacle 13 and the pipe connections and passages of the feeder apparatus will be the same. There will be no flow at all of liquid, or water, from the supply pipe 10 or liquid, or chlorine solution, 12 in the feeder apparatus when the conditions are static.

Assuming the suction pump 47 to be in operation while the manually actuable valves 46, 39 and 45 are open, flow of liquid, or water, from the supply pipe 10, past said valve 46, to and through said suction pump 47 will evidently occur by reason of head pressure created by the suction pump.

The valve 46, situated in the supply pipe 10 at location between the feed pipe 36 and the discharge pipe 41, is adapted to be adjusted to provide an opening past said valve 46 which will cause a predetermined and intended differential in pressure to exist between the upstream and downstream sides of said opening with movement of liquid, or water, through said supply pipe 10 past said feed pipe 36, the valve 46 and said discharge pipe 41. Stated otherwise, the valve 46 will be set, during practical operation of the feeder apparatus, so that actuation of the suction pump 47 will cause pressure having value less than atmospheric pressure to be existent in the mixing receptacle 13. The amount of differential in pressure which exists at the upstream and downstream sides of the valve 46 can of course be varied to have any predetermined value which may be intended by adjustment of said valve to thus alter, increase or decrease, the size of the opening past the valve.

When the valves 46, 39 and 45 are open and the suction pump 47 is in operation to cause pressure less than atmospheric pressure to be existent in the mixing receptacle 13, atmospheric pressure acting upon the surface of the liquid, or chlorine solution, 12 in the reservoir 11 will evidently exert effort tending to cause flow of liquid, or chlorine solution, from said reservoir through the feed pipe 19 and the fitting 20 into the container 17.

Assuming the suction pump 47 to be in operation and the valves 46, 39 and 45 to be open, it will be evident that with flow of liquid, or water, from the supply pipe 10 past the feed pipe 36, the valve 46 and the discharge pipe 41, there will be flow of liquid, or water, from said supply pipe 10 through said feed pipe 36 into the tilt bucket 28, as well as capacity for flow from the mixture receiving compartment 18 of the mixing receptacle 13 through the discharge pipe 41, when the valve 46 is set to cause pressure within said mixing receptacle 13 to have value less than the pressure, which desirably may be atmospheric pressure, within the upstream side of the supply pipe 10. It will also be evident that with increase of the differential in pressure between the upstream and downstream sides of the valve 46, there will be proportional increase in the flow of liquid, or water, from said supply pipe 10 into the tilt bucket 28, and vice versa. Naturally, there will be increase of differential in pressure with increase in the rate of flow of liquid, or water, from the supply pipe 10 out of its outlet connection, and vice versa, and the rate of increase or decrease of differential in pressure will vary in proportion as there is increase or decrease in the rate of flow of liquid, or water from said supply pipe past the valve 46. That is, the amount of liquid, or water, caused to enter the tilt bucket 28 from the supply pipe 10 will be directly proportional to the amount of liquid, or water, which is caused to flow from said supply pipe 10 past the valve 46 and the discharge pipe 41, no matter what may be the rate of speed of travel of the liquid, or water, through the supply pipe.

Substantially all of the liquid, or water, which reaches the mixing receptacle 13 by way of the feed pipe 36 first enters the tilt bucket 28 and is spilled from said tilt bucket to the mixture receiving compartment 18. Each time the tilt bucket unloads its content to said mixture receiving compartment 18 there is also a dipper full of liquid, or chlorine solution, dumped into the mixture receiving compartment. Stated differently, the relative amounts of liquid, or water, from the supply pipe 10 and liquid, or chlorine solution, 12 from the reservoir 11 fed to the mixture receiving compartment 18 are accurately measured. The relative proportions of the different liquids to be mixed will obviously depend upon the relative sizes of the tilt bucket 28 and the dipper 35, etc. The rapidity of action of the tilt bucket can be controlled by adjustment of the pressure differential creating means, such as the valve 46, or by regulation of the capacity for flow through the feed pipe 36, as by manipulation of the valve 39, or by both adjustment of said pressure differential creating means and regulation of flow through said feed pipe 36. A range of sizes of dippers, such as 35, can be employed. Obviously, the feeder apparatus includes provision for a very flexible feed as to volume of chlorine solution in proportion to water.

The liquid, or chlorine solution, 12 fed to the mixture receiving compartment or area 18 becomes there intermingled with, and only with, the liquid, or water, which flows from the supply pipe 10 through the feed pipe 36 into the mixing receptacle 13. Evidently, upon union of the chlorine solution, which reaches the mixing receptacle from the reservoir 11, with the water, which reaches said mixing receptacle from the supply pipe 10, said water and chlorine solution will be mixed together in precisely the proportions which were predetermined, regardless of the value of the differential in pressure between the upstream and downstream sides of the valve 46, or equivalent, during operation of the feeder apparatus.

The mixed liquids, water and chlorine solution, will flow from the mixture receiving compartment 18 by way of the discharge pipe 41 into the downstream side of the supply pipe 10 and thence through the suction pump 47 to the outlet of said supply pipe. Thus, the portion of the liquid, or water, diverted from the supply pipe 10 to the mixing receptacle 13 rejoins, and the liquid, or chlorine solution, fed to said mixing receptacle from the reservoir 11 joins, the main body or liquid, or water, on passage from the supply pipe 10 to its outlet connection.

In the disclosure as made, the reservoir 11 is situated at elevation below the mixing receptacle 13, but said reservoir could be at a level higher or lower than shown. The construction and arrangement will be such that, in any installation of the feeder apparatus, pressure less than atmospheric pressure within the mixing receptacle 13 will permit feed of liquid, or chlorine solution, into said mixing receptacle in response to the action of atmospheric pressure.

In instances when the suction pump, such as 47, is of the reciprocatory piston type no further controls are necessary. However, should an installation include a suction pump of the centrifugal type, a check valve installed at either side of the suction pump will prevent back flow when said suction pump is inoperative.

The feeder apparatus is of quite simple construction and includes no delicate parts or minute passages liable to become clogged. The only movable parts of the feeder apparatus during its operation in practice are the tilt bucket 28 with the dipper 35, the float 26 and its appurtenances, and the operative parts of the suction pump 47.

What is claimed is:

1. In an apparatus for feeding chlorinating solution into a water main in direct proportion to flow of water in said main, first means to restrict the flow of water in the main, second means downstream of said first means operative to cause pressure in said main between said first and second means to be of value less than atmospheric, an air tight mixing receptacle, a feed pipe leading from said water main upstream of said first means into said mixing receptacle, a discharge pipe leading from a lower portion of said mixing receptacle and opening to said water main between the first and second means, a chlorinating solution containing reservoir open to atmosphere, and a feed pipe leading from within said reservoir into said mixing receptacle.

2. The combination as specified in claim 1 wherein said first means is adjustable to provide various degrees of restriction to flow of water in said main.

3. In an apparatus for feeding into a first liquid being conveyed in a main a second liquid in direct proportion to flow of said first liquid, a valve located in said main operable to restrict flow of said first liquid, a pump in said main downstream of said valve operative to cause pressure in the main between said valve and said pump to have value less than atmospheric, an air tight mixing receptacle, a feed pipe leading from said main upstream of said valve into said mixing receptacle, a discharge pipe leading from a lower portion of said mixing receptacle and opening to said main between said pump and said valve, a reservoir for containing the second liquid open to atmosphere, and a feed pipe leading from within said reservoir into said mixing receptacle.

4. In an apparatus for feeding into a first liquid being conveyed in a main a second liquid in direct proportion to flow of said first liquid, a valve in said main operable to restrict flow of said first liquid, a pump in said main at a point downstream of said valve operative to cause pressure in said main between said valve and said pump to have value less than atmospheric, an air tight mixing receptacle constituted as a mixture receiving compartment and a container for said second liquid, a feed pipe leading from said main upstream of said valve into said mixture receiving compartment, a device in said mixing receptacle for conveying a measured quantity of the second liquid from said container to said compartment in response to flow of a specific quantity of the first liquid from said feed pipe into said compartment, a discharge pipe leading from a lower portion of said mixture receiving compartment and opening to said main between said pump and said valve, a reservoir for containing said second liquid open to atmosphere, and a feed pipe leading from within said reservoir into said container.

5. In an apparatus for feeding a chlorinating solution to a water main in direct proportion to flow of water in said main, a valve in said main operable to restrict flow of water in the main, a pump in said main downstream of said valve operative to cause pressure in the main between said valve and said pump to be of value less than atmospheric, an air tight mixing receptacle, a feed pipe leading from said water main upstream of said valve to said mixing receptacle, a discharge pipe leading from a lower portion of said mixing receptacle and opening to said water main between said pump and said valve, a chlorinating solution containing reservoir open to atmosphere, and a feed pipe leading from within said reservoir into said mixing receptacle.

6. In an apparatus for feeding a chlorinating solution into a water main in direct proportion to flow of water in said main, a valve in said main operable to restrict flow of water in said main, a pump in said main downstream of said valve operative to cause pressure in the main between said valve and said pump to be of value less than atmospheric, an air tight mixing receptacle comprising a mixture receiving compartment and a chlorinating solution container, a feed pipe leading from said water main upstream of said valve into said mixture receiving compartment, a device in said mixing receptacle for conveying a measured quantity of the chlorinating solution from said container to said compartment in response to flow of a specific quantity of water from said feed pipe into said compartment, a discharge pipe leading from a lower portion of said mixture receiving compartment and opening to said water main between said pump and said valve, a chlorinating solution containing reservoir open to the atmosphere, and a feed pipe leading from within said reservoir into said chlorinating solution container in said mixing receptacle.

7. The method of mixing predetermined proportion of chlorinating solution with water made to flow under pressure through a pipe line, consisting of the steps as follows: restricting the flow of water at a location along the length of the pipe line and applying suction downstream of said location to create and maintain a low pressure portion in said pipe line between said restriction and said suction, said low pressure portion having a pressure therein of value less than atmospheric pressure and less than pressure upstream of said restriction, utilizing said pressure less than atmospheric pressure in said pipe line to maintain pressure less than atmospheric pressure in an enclosed receiving area, conveying portions of said chlorinating solution into said enclosed receiving area through the action of atmospheric pressure on the chlorinating solution, continuously diverting a proportional part of the water flowing in said pipe line upstream of the low pressure portion under the action of the pressure upstream of said low pressure portion to the enclosed receiving area, and utilizing the pressure upstream of said low pressure portion acting on said water and atmospheric pressure acting on the chlorinating solution to convey said chlorinating solution and said water from the receiving area into the low pressure portion of said pipe line.

8. The method of mixing a predetermined proportion of chlorinating solution with water made to flow under pressure through a pipe line, consisting of the steps as follows: restricting the flow of water at a location along the length of the pipe line and applying suction downstream of said location to create and maintain a low pressure portion in said pipe line between said restriction and said suction, said low pressure portion having pressure therein of value less than atmospheric pressure and less than pressure upstream of said restriction, utilizing said pressure less than atmospheric pressure in said pipe line to maintain pressure less than atmospheric pressure in a mixing area of an enclosed receptacle, conveying portions of said chlorinating solution to a container in said enclosed receptacle in response to the action of atmospheric pressure on the chlorinating solution, continuously diverting a portion of water flowing through said pipe line upstream of the low pressure portion under the action of said pressure upstream of said low pressure portion to said mixing area, utilizing the flow of water to said mixing area to convey measured quantities of said chlorinating solution from said container to said mixing area, and utilizing the pressure upstream of said low pressure portion acting on said water and atmospheric pressure acting on the chlorinating solution to convey a mixture of water flowing to said mixing area and measured quantities of chlorinating solution from the mixing area of said enclosed receptacle to the low pressure portion of said pipe line.

9. The method of mixing in predetermined proportions a first liquid made to flow under pressure through a pipe line and a second liquid, consisting of the steps as follows: restricting flow of said first liquid at a location along the length of the pipe line and applying suction downstream of said location to create and maintain a low pressure portion in said pipe line between said restriction and said suction, said low pressure portion having a pressure therein of value less than atmospheric pressure and less than pressure upstream of said restriction, utilizing said pressure less than atmospheric pressure in said pipe line to maintain pressure less than atmospheric pressure in an enclosed receiving area, conveying portions of said second liquid into said enclosed receiving area under the action of atmospheric pressure on the second liquid, continuously diverting a portion of the first liquid flowing in said pipe line upstream of the low pressure portion under the action of said pressure upstream of said low pressure portion to the enclosed receiving area, and utilizing the pressure upstream of said low pressure portion acting on said water and atmospheric pressure acting on the second liquid to convey said second liquid and first liquid from the receiving area into the low pressure portion of said pipe line.

LAWRENCE E. ALBERTSON.

REFERENCES CITED

The following references are of record in the file of this patent:

UNITED STATES PATENTS

| Number | Name | Date |
| --- | --- | --- |
| 1,193,038 | Mann | Aug. 1, 1916 |
| 1,905,244 | Rohlin | Apr. 25, 1933 |
| 1,934,791 | Butzler | Nov. 14, 1933 |
| 1,946,474 | Banks et al. | Feb. 13, 1934 |
| 2,211,753 | Leopold | Aug. 20, 1940 |
| 2,362,606 | Albertson et al. | Nov. 14, 1944 |
| 2,362,707 | Albertson | Nov. 14, 1944 |
| 2,467,109 | Bell et al. | Apr. 12, 1949 |

FOREIGN PATENTS

| Number | Country | Date |
| --- | --- | --- |
| 104,919 | Great Britain | Mar. 22, 1916 |
| 610,316 | Germany | Mar. 8, 1935 |